United States Patent
Sitnikov et al.

(10) Patent No.: US 10,564,653 B2
(45) Date of Patent: Feb. 18, 2020

(54) FLUSHING VERIFICATION AND MANAGEMENT SYSTEM

(71) Applicant: Mueller International, LLC, Atlanta, GA (US)

(72) Inventors: Timofey Sitnikov, Harrison, TN (US); Harold Mosley, Ooltewah, TN (US); Timothy J. Mitchell, Hixson, TN (US)

(73) Assignee: Mueller International, LLC, Atlanta, GA (US)

( * ) Notice: Subject to any disclaimer, the term of this patent is extended or adjusted under 35 U.S.C. 154(b) by 125 days.

(21) Appl. No.: 15/952,457

(22) Filed: Apr. 13, 2018

(65) Prior Publication Data

US 2019/0317533 A1 Oct. 17, 2019

(51) Int. Cl.
  *G05D 7/06* (2006.01)
  *F16K 31/40* (2006.01)
  *F16K 37/00* (2006.01)

(52) U.S. Cl.
  CPC ......... *G05D 7/0623* (2013.01); *F16K 31/408* (2013.01); *F16K 37/005* (2013.01)

(58) Field of Classification Search
  CPC ... G05D 7/0623; F16K 31/408; F16K 37/005; F16K 37/0091; Y10T 137/7761; Y10T 137/8326
  USPC .............................................. 137/487.5, 557
  See application file for complete search history.

(56) References Cited

U.S. PATENT DOCUMENTS

| | | | |
|---|---|---|---|
| 1,018,251 A | 2/1912 | McKee | |
| 1,086,841 A | 2/1914 | Mueller | |
| 1,969,432 A | 8/1934 | Smith et al. | |
| RE21,470 E | 5/1940 | White | |
| 2,262,489 A | 11/1941 | Bolser | |
| 2,574,982 A | 11/1951 | Mueller | |
| 2,576,630 A | 11/1951 | Mueller | |
| 2,580,197 A | 12/1951 | Schmid | |

(Continued)

FOREIGN PATENT DOCUMENTS

| AU | 2011202554 | 12/2012 |
|---|---|---|
| AU | 2015201277 | 10/2017 |

(Continued)

OTHER PUBLICATIONS

Fleury Jr., Leo W.; Final Office Action for U.S. Appl. No. 13/841,597, filed Mar. 15, 2013, dated Apr. 14, 2015, 18 pgs.

(Continued)

*Primary Examiner* — William M McCallister
(74) *Attorney, Agent, or Firm* — Taylor English Duma LLP

(57) ABSTRACT

Methods, systems, and computer-readable storage media for controlling and monitoring an electro-mechanical flushing mechanism in a pressurized water distribution system. A first pressure reading of water in a supply channel is taken, the supply channel being in fluid communication with a distribution line of the water distribution system and terminated by a flushing valve. The flushing valve is then actuated causing the valve to change state. A second pressure reading is taken of the water in the supply channel and a difference between the first and second pressure readings is computed. The computed difference is compared to a minimum pressure differential value, and, upon determining that the difference is not greater than the minimum pressure differential value, a central control system of the water distribution system is alerted that a valve failure has occurred.

14 Claims, 3 Drawing Sheets

(56) References Cited

U.S. PATENT DOCUMENTS

| | | |
|---|---|---|
| 2,752,307 A | 6/1956 | Baran et al. |
| 2,931,382 A | 4/1960 | Cirillo |
| 3,095,893 A | 7/1963 | Martin |
| 3,103,946 A | 9/1963 | Troxell |
| 3,283,776 A | 11/1966 | Flanagan et al. |
| 3,391,790 A | 7/1968 | Lerner |
| 3,566,905 A | 3/1971 | Noland |
| 3,592,212 A | 7/1971 | Schleimer et al. |
| 3,682,311 A | 8/1972 | Bishop |
| 3,935,736 A | 2/1976 | Enright |
| 3,961,528 A | 6/1976 | Ford |
| 3,961,642 A | 6/1976 | Thomas et al. |
| 3,962,733 A | 6/1976 | Parry |
| 3,980,096 A | 9/1976 | Ellis et al. |
| 3,993,561 A | 11/1976 | Swearingen |
| 4,002,566 A | 1/1977 | Smith |
| 4,083,377 A | 4/1978 | Luckenbill |
| 4,154,259 A | 5/1979 | Ellis et al. |
| 4,165,532 A | 8/1979 | Kendall et al. |
| 4,182,361 A | 1/1980 | Oakey |
| 4,189,776 A | 2/1980 | Kendall |
| 4,212,424 A | 7/1980 | Fortune |
| 4,216,185 A | 8/1980 | Hopkins |
| 4,305,282 A | 12/1981 | Hunt |
| RE31,023 E | 9/1982 | Hall, III |
| 4,373,838 A | 2/1983 | Foreman et al. |
| 4,393,891 A | 7/1983 | Snoek et al. |
| 4,483,189 A | 11/1984 | Seal |
| 4,556,080 A | 12/1985 | Picaud |
| 4,561,459 A | 12/1985 | Jackman |
| 4,575,130 A | 3/1986 | Pemberton et al. |
| 4,584,106 A | 4/1986 | Held |
| 4,615,390 A | 10/1986 | Lucas et al. |
| 4,639,718 A | 1/1987 | Gasper |
| 4,653,521 A | 3/1987 | Fillman |
| 4,676,914 A | 6/1987 | Mills et al. |
| 4,706,929 A | 11/1987 | Kalaskie et al. |
| 4,721,408 A | 1/1988 | Hewlett |
| 4,756,479 A | 7/1988 | Lazenby, III |
| 4,774,978 A | 10/1988 | Lepine, Jr. et al. |
| 4,779,142 A | 10/1988 | Freeman et al. |
| 4,816,154 A | 3/1989 | Hartley et al. |
| 4,830,757 A | 5/1989 | Lynch |
| 4,838,485 A | 6/1989 | Rinkewich |
| 4,876,530 A | 10/1989 | Hill et al. |
| 4,898,107 A | 2/1990 | Dickinson |
| 4,989,830 A | 2/1991 | Ratnik |
| 4,992,380 A | 2/1991 | Moriarty et al. |
| 5,002,428 A | 3/1991 | Shettel |
| 1,282,298 A | 4/1991 | Franklin |
| 5,010,912 A | 4/1991 | Riding |
| 5,011,598 A | 4/1991 | Nathanson |
| 5,025,754 A | 6/1991 | Plyler |
| 5,032,290 A | 7/1991 | Yamagata et al. |
| 5,042,524 A | 8/1991 | Lund |
| RE33,723 E | 10/1991 | Hartley |
| 5,115,833 A | 5/1992 | Himle |
| 5,133,622 A | 7/1992 | Hewlett |
| 5,136,983 A | 8/1992 | Hostetler et al. |
| 5,145,214 A | 9/1992 | Hunt |
| 5,176,165 A | 1/1993 | Traylor |
| 5,184,571 A | 2/1993 | Hostetler et al. |
| 5,201,338 A | 4/1993 | McKeague |
| 5,227,067 A | 7/1993 | Runyon |
| 5,227,068 A | 7/1993 | Runyon |
| 5,240,179 A | 8/1993 | Drinkwater |
| 5,249,745 A | 10/1993 | Bertolotti |
| 5,261,348 A | 11/1993 | Neihaus et al. |
| 5,264,368 A | 11/1993 | Clarke et al. |
| 5,291,207 A | 3/1994 | Kikuchi et al. |
| 5,314,619 A | 5/1994 | Runyon |
| 5,324,665 A | 6/1994 | Lessard |
| 5,331,694 A | 7/1994 | MacKenzie et al. |
| 5,332,494 A | 7/1994 | Eden et al. |
| 5,351,712 A | 10/1994 | Houlihan |
| 5,360,488 A | 11/1994 | Hieatt et al. |
| 5,368,227 A | 11/1994 | McGinnis |
| 5,368,343 A | 11/1994 | Allen |
| 5,427,748 A | 6/1995 | Wiedrich et al. |
| 5,479,338 A | 12/1995 | Ericksen et al. |
| 5,480,562 A | 1/1996 | Lemelson |
| 5,490,561 A | 2/1996 | Cardoso-Neto et al. |
| 5,527,470 A | 6/1996 | Suda |
| 5,535,984 A | 7/1996 | Anderson et al. |
| 5,540,845 A | 7/1996 | Blanchard et al. |
| 5,547,164 A | 8/1996 | Ratnik et al. |
| 5,549,133 A | 8/1996 | Sigelakis |
| 5,553,637 A | 9/1996 | Hoeptner, III |
| 5,582,440 A | 12/1996 | Pascaru |
| 5,587,055 A | 12/1996 | Hartman et al. |
| 5,609,124 A | 3/1997 | Leclerc |
| 5,623,900 A | 4/1997 | Topfer et al. |
| 5,623,990 A | 4/1997 | Pirkle |
| 5,645,011 A | 7/1997 | Winkler et al. |
| 5,646,863 A | 7/1997 | Morton |
| 5,746,923 A | 5/1998 | Forward |
| 5,775,372 A | 7/1998 | Houlihan |
| 5,788,858 A | 8/1998 | Acernese et al. |
| 5,797,417 A | 8/1998 | Delattre et al. |
| 5,803,111 A | 9/1998 | Soszka |
| 5,813,363 A | 9/1998 | Snelling |
| 5,817,231 A | 10/1998 | Souza |
| 5,829,475 A | 11/1998 | Acker |
| 5,865,991 A | 2/1999 | Hsu |
| 5,885,364 A | 3/1999 | Hieatt et al. |
| 5,915,395 A | 6/1999 | Smith |
| 5,921,207 A | 7/1999 | Disalvo et al. |
| 5,921,270 A | 7/1999 | McCarty |
| 5,979,482 A | 11/1999 | Scott |
| 5,996,608 A | 12/1999 | Hunter et al. |
| 6,003,780 A | 12/1999 | Gurries, II et al. |
| 6,021,664 A | 2/2000 | Granato et al. |
| 6,035,704 A | 3/2000 | Newman |
| 6,044,911 A | 4/2000 | Haase, III |
| 6,056,211 A | 5/2000 | Diloreto |
| 6,058,957 A | 5/2000 | Honigbaum |
| 6,062,259 A | 5/2000 | Poirier |
| 6,062,606 A | 5/2000 | Carpini |
| 6,063,275 A | 5/2000 | Traylor |
| 6,095,429 A | 8/2000 | Killgrove et al. |
| 6,116,525 A | 9/2000 | Grimes |
| 6,129,002 A | 10/2000 | Lisec et al. |
| 6,170,514 B1 | 1/2001 | Esmailzadeh |
| 6,221,257 B1 | 4/2001 | Grim |
| 6,227,463 B1 | 5/2001 | Porter |
| 6,227,464 B1 | 5/2001 | Allmendinger et al. |
| 6,245,224 B1 | 6/2001 | Enoki et al. |
| 6,283,139 B1 | 9/2001 | Symonds et al. |
| 6,290,267 B1 | 9/2001 | Swingley |
| 6,290,908 B1 | 9/2001 | Fukunaga et al. |
| 6,294,096 B1 | 9/2001 | Pate |
| 6,356,811 B1 | 3/2002 | Beselt |
| 6,358,408 B1 | 3/2002 | Newman |
| 6,385,794 B1 | 5/2002 | Miedzius et al. |
| 6,467,498 B1 | 10/2002 | Esmailzadeh |
| 6,491,062 B1 | 12/2002 | Croft |
| 6,520,431 B2 | 2/2003 | Donovan |
| 6,524,681 B1 | 2/2003 | Seitz et al. |
| 6,627,089 B1 | 9/2003 | Wilkinson |
| 6,635,172 B2 | 10/2003 | Newman |
| 6,684,900 B1 | 2/2004 | McKeague |
| 6,711,758 B2 | 3/2004 | Terek et al. |
| 6,753,186 B2 | 6/2004 | Moskoff |
| 6,820,635 B1 | 11/2004 | McKeague |
| 6,820,646 B2 | 11/2004 | Helle |
| 6,868,860 B2 | 3/2005 | Davidson |
| 6,880,566 B2 | 4/2005 | Newman |
| 6,948,512 B2 | 9/2005 | McKeague |
| 7,093,608 B2 | 8/2006 | Taylor |
| 7,110,920 B2 | 9/2006 | McCarter et al. |
| 7,178,739 B2 | 2/2007 | Taylor |
| 7,240,852 B2 | 7/2007 | Taylor |
| 7,240,853 B2 | 7/2007 | Taylor |
| 7,240,854 B2 | 7/2007 | Taylor |

(56) References Cited

U.S. PATENT DOCUMENTS

| | | |
|---|---|---|
| 7,276,159 B2 | 10/2007 | Taylor et al. |
| 7,434,781 B2 | 10/2008 | Taylor et al. |
| 7,459,091 B2 | 12/2008 | Johnson et al. |
| 7,473,359 B1 | 1/2009 | Barrett, II |
| 7,497,228 B2 | 3/2009 | Taylor et al. |
| 7,509,972 B2 | 3/2009 | Nesbitt |
| 7,520,294 B2 | 4/2009 | German |
| 7,866,204 B2 | 1/2011 | Yang et al. |
| 8,020,575 B1 | 9/2011 | Watson |
| 8,321,806 B2 | 11/2012 | Agrusa et al. |
| 8,531,303 B2 | 9/2013 | Pram et al. |
| 9,151,023 B2 | 10/2015 | Taylor et al. |
| 9,194,108 B2 | 11/2015 | Fleury, Jr. et al. |
| 9,238,904 B2 | 1/2016 | Mosley et al. |
| 9,428,888 B2 | 8/2016 | Mosley et al. |
| 9,458,609 B2 | 10/2016 | Fleury, Jr. |
| 9,624,652 B2 | 4/2017 | Clark |
| 9,624,653 B2 | 4/2017 | Clark |
| 9,957,697 B2 | 5/2018 | Taylor et al. |
| 2002/0024033 A1 | 2/2002 | Burkhardt |
| 2002/0029412 A1 | 3/2002 | Veal |
| 2002/0043490 A1 | 4/2002 | Newman |
| 2002/0053104 A1 | 5/2002 | Rump et al. |
| 2002/0069457 A1 | 6/2002 | Meier et al. |
| 2002/0073482 A1 | 6/2002 | Hashemi |
| 2002/0092090 A1 | 7/2002 | Johnson |
| 2002/0117214 A1 | 8/2002 | Tucker et al. |
| 2002/0144952 A1 | 10/2002 | Saxton |
| 2002/0157176 A1 | 10/2002 | Wawrla et al. |
| 2002/0157708 A1 | 10/2002 | Goff |
| 2002/0162166 A1 | 11/2002 | Saar et al. |
| 2002/0194670 A1 | 12/2002 | Hashemi |
| 2003/0041370 A1 | 3/2003 | Chung |
| 2003/0057155 A1 | 3/2003 | Husain et al. |
| 2003/0066125 A1 | 4/2003 | Guler |
| 2003/0102450 A1 | 6/2003 | Parsons et al. |
| 2003/0107485 A1 | 6/2003 | Zoratti |
| 2003/0155443 A1 | 8/2003 | Ace-Kirker |
| 2003/0193036 A1 | 10/2003 | Mike |
| 2004/0031446 A1 | 2/2004 | Harrison |
| 2004/0054484 A1 | 3/2004 | Farabaugh et al. |
| 2004/0054851 A1 | 3/2004 | Acton et al. |
| 2004/0068784 A1 | 4/2004 | Muderlak |
| 2004/0079689 A1 | 4/2004 | Taylor et al. |
| 2004/0143893 A1 | 7/2004 | Wu et al. |
| 2004/0197922 A1 | 10/2004 | Cooper |
| 2004/0238028 A1 | 12/2004 | Taylor et al. |
| 2004/0238037 A1 | 12/2004 | Taylor et al. |
| 2004/0238458 A1 | 12/2004 | Taylor et al. |
| 2004/0252556 A1 | 12/2004 | Taylor et al. |
| 2004/0259189 A1 | 12/2004 | Marschke |
| 2005/0273924 A1 | 12/2005 | Taylor et al. |
| 2005/0273925 A1 | 12/2005 | Taylor et al. |
| 2005/0274812 A1 | 12/2005 | Taylor et al. |
| 2005/0279846 A1 | 12/2005 | Taylor et al. |
| 2006/0027265 A1 | 2/2006 | Ball, Jr. |
| 2007/0075162 A1 | 4/2007 | McKeague |
| 2007/0090059 A1 | 4/2007 | Plummer |
| 2007/0255515 A1 | 11/2007 | Hoehner et al. |
| 2008/0017589 A1 | 1/2008 | Taylor et al. |
| 2008/0293042 A1 | 11/2008 | Cooper |
| 2009/0000666 A1 | 1/2009 | Peyton |
| 2009/0178721 A1 | 7/2009 | Thompson |
| 2009/0277910 A1 | 11/2009 | Buttz |
| 2010/0032600 A1 | 2/2010 | Doe et al. |
| 2010/0065287 A1 | 3/2010 | Burkhart et al. |
| 2010/0121496 A1 | 5/2010 | Paulus |
| 2010/0156632 A1 | 6/2010 | Hyland et al. |
| 2010/0163765 A1 | 7/2010 | Gregoire |
| 2010/0193715 A1 | 8/2010 | Gethmann |
| 2010/0200096 A1 | 8/2010 | Cimberio et al. |
| 2010/0263295 A1 | 10/2010 | Flanagan |
| 2010/0282225 A1 | 11/2010 | Gilbert et al. |
| 2011/0066297 A1 | 3/2011 | Saberi |
| 2012/0048386 A1 | 3/2012 | Clark |
| 2012/0298208 A1 | 11/2012 | Taylor |
| 2013/0199625 A1 | 8/2013 | Fleury et al. |
| 2013/0206241 A1 | 8/2013 | Fleury, Jr. et al. |
| 2014/0352800 A1 | 12/2014 | Clark |
| 2015/0053278 A1 | 2/2015 | Mosley |
| 2016/0010315 A1 | 1/2016 | Taylor |
| 2016/0083938 A1 | 3/2016 | Mosley |

FOREIGN PATENT DOCUMENTS

| | | |
|---|---|---|
| AU | 2017232180 | 5/2019 |
| CA | 2334961 | 8/2007 |
| CA | 2570161 | 7/2013 |
| CA | 2430686 | 10/2013 |
| CA | 2822237 | 3/2016 |
| CA | 2741889 | 9/2018 |
| DE | 3103126 | 10/1982 |
| EP | 2527543 | 3/2019 |
| FR | 2715986 | 8/1995 |
| FR | 2754554 | 4/1998 |
| GB | 2452311 | 3/2009 |
| WO | 9964975 | 12/1999 |
| WO | 0109041 | 2/2001 |
| WO | 2005124494 | 12/2005 |
| WO | 2008148952 | 12/2008 |
| WO | 2010109117 | 9/2010 |
| WO | 2011047246 | 4/2011 |
| WO | 2013119661 | 8/2013 |
| WO | 2014149530 | 9/2014 |

OTHER PUBLICATIONS

Fleury Jr., Leo W.; Issue Notification for U.S. Appl. No. 13/841,597, filed Mar. 15, 2013, dated Nov. 4, 2015, 1 pg.

Fleury Jr., Leo W.; Non-Final Office Action for U.S. Appl. No. 13/841,597, filed Mar. 15, 2013, dated Nov. 3, 2014, 33 pgs.

Fleury Jr., Leo W.; Notice of Allowance for U.S. Appl. No. 13/841,597, filed Mar. 15, 2013, dated Aug. 26, 2015, 10 pgs.

Fleury Jr., Leo W.; Restriction Requirement for U.S. Appl. No. 13/841,597, filed Mar. 15, 2013, dated Sep. 11, 2014, 6 pgs.

Fleury Jr., Leo W.; Supplemental Notice of Allowability for U.S. Appl. No. 13/841,597, filed Mar. 15, 2013, dated Oct. 9, 2015, 4 pgs.

Mosley, Harold; Issue Notification for U.S. Appl. No. 13/971,282, filed Aug. 20, 2013, dated Dec. 29, 2015, 1 pg.

Mosley, Harold; Non-Final Office Action for U.S. Appl. No. 13/971,282, filed Aug. 20, 2013, dated Jun. 8, 2015, 14 pgs.

Mosley, Harold; Notice of Allowance for U.S. Appl. No. 13/971,282, filed Aug. 20, 2013, dated Oct. 16, 2015, 8 pgs.

Mosley, Harold; Issue Notification for U.S. Appl. No. 14/959,043, filed Dec. 4, 2015, dated Aug. 11, 2016, 1 pg.

Mosley, Harold; Non-Final Office Action for U.S. Appl. No. 14/959,043, filed Dec. 4, 2015, dated Mar. 10, 2016, 20 pgs.

Mosley, Harold; Notice of Allowance for U.S. Appl. No. 14/959,043, filed Dec. 4, 2015, dated May 11, 2016, 11 pgs.

Newman, Michael; International Search Report for serial No. PCT/US1999/013296, filed Jun. 11, 1999, dated Aug. 30, 1999 3 pgs.

Taylor, Thomas; Office Action from Canadian Intellectual Property Office for Application No. 2,430,686, filed May 30, 2003 dated Jun. 20, 2012, 3 pgs.

Goslin, David; Canadian Office Action for serial No. 2,822,237, filed Aug. 13, 2013, dated Jan. 6, 2015, 4 pgs.

Taylor, Thomas; International Preliminary Report on Patentability for serial No. PCT/US2005/019941, filed Jun. 8, 2005, dated Dec. 14, 2006, 5 pgs.

Taylor, Thomas; International Search Report for serial No. PCT/US2005/019941, filed Jun. 8, 2005, dated Dec. 5, 2005, 3 pgs.

Taylor; Office Action from Canadian Intellectual Property Office for Application No. 2,570,161, filed Dec. 8, 2006, dated May 3, 2012; 2 pgs.

Australian Patent Examination Report for application No. 2011202554, filed Jun. 1, 2011, dated Sep. 25, 2014, 3 pgs.

Taylor, Thomas; Office Action for Canadian patent application No. 2,741,889, filed May 31, 2011, dated Jun. 5, 2017, 3 pgs.

(56) References Cited

OTHER PUBLICATIONS

Thomas; Thomas; Mexico Office Action for serial No. MX/a/2012/005832, filed May 18, 2012, dated Jul. 17, 2014, 7 pgs.
Taylor, Thomas M.; European Office Action for serial No. 12169186.9, filed May 24, 2012, dated May 12, 2015, 4 pgs.
Taylor, Thomas; Office Action for European application No. 12169186.9, filed May 24, 2012, dated Dec. 11, 2017, 5 pgs.
Taylor, Thomas M.; Australian Patent Examination Report for serial No. 2015201277, filed Jun. 1, 2011, dated Nov. 22, 2016, 5 pgs.
Fleury Jr., Leo W.; International Preliminary Report on Patentability for serial No. PCT/US2013/024928, filed Feb. 6, 2013, dated Aug. 21, 2014, 9 pgs.
Fleury Jr., Leo W.; International Search Report and Written Opinion for serial No. PCT/US2013/024928, filed Feb. 6, 2013, dated Apr. 5, 2013, 10 pgs.
Fleury Jr., Leo W.; International Preliminary Report on Patentability for PCT/US14/19315, filed Feb. 28, 2014, dated Sep. 24, 2015, 9 pgs.
Fleury Jr., Leo W.; International Search Report and Written Opinion for serial No. PCT/US14/19315, filed Feb. 28, 2014, dated Sep. 2, 2014, 12 pgs.
Fleury, Jr., Leo W.; Extended European Search Report for serial No. 14768557, filed Feb. 28, 2014, dated Oct. 6, 2016, 6 pgs.
Fleury Leo, W.; Office Action for Mexico Application No. MX/a12014/009503, filed Feb. 6, 2013, dated Feb. 20, 2017, 4 pgs.
Taylor; European Search Report for serial No. 12169186.9, filed May 24, 2012, dated Aug. 8, 2012, 7 pgs.
Parker Instrumentation; "Bleed/Purge Valves (BV & PG Series)", Catalog 4133-BP, Revised Feb. 2002, 6 pgs.
Clark, Kenneth A.; Restriction Requirement for U.S. Appl. No. 13/216,905, filed Aug. 24, 2011, dated May 15, 2014, 6 pgs.
Clark, Kenneth A.; Advisory Action for U.S. Appl. No. 13/216,905, filed Aug. 24, 2011, dated Aug. 30, 2016, 4 pgs.
Clark, Kenneth A.; Applicant Initiated Interview Summary for U.S. Appl. No. 13/216,905, filed Aug. 24, 2011, dated Aug. 1, 2016, 3 pgs.
Clark, Kenneth A.; Applicant Interview Summary for U.S. Appl. No. 13/216,905, filed Aug. 24, 2011, dated Nov. 12, 2015, 3 pgs.
Clark, Kenneth A.; Issue Notification for U.S. Appl. No. 13/216,905, filed Aug. 24, 2011, dated Mar. 29, 2017, 1 page.
Clark, Kenneth A.; Non-Final Office Action for U.S. Appl. No. 13/216,905, filed Aug. 24, 2011, dated Aug. 12, 2014, 24 pgs.
Clark, Kenneth A.; Non-Final Office Action for U.S. Appl. No. 13/216,905, filed Aug. 24, 2011, dated Feb. 11, 2015, 24 pgs.
Clark, Kenneth A.; Notice of Allowability for U.S. Appl. No. 13/216,905, filed Aug. 24, 2011, dated Feb. 27, 2017, 9 pgs.
Clark, Kenneth A.; Notice of Allowance for U.S. Appl. No. 13/216,905, filed Aug. 24, 2011, dated Feb. 8, 2016, 19 pgs.
Clark, Kenneth A.; Non-Final Office Action for U.S. Appl. No. 13/216,905, filed Aug. 24, 2011, dated Dec. 9, 2015, 28 pgs.
Clark, Kenneth A.; Final Office Action for U.S. Appl. No. 13/216,905, filed Aug. 24, 2011, dated Aug. 25, 2015, 28 pgs.
Clark, Kenneth A.; Final Office Action for U.S. Appl. No. 13/216,905, filed Aug. 24, 2011, dated Jun. 23, 2016, 40 pgs.
Taylor, Thomas; Notice of Allowance for U.S. Appl. No. 10/856,035, filed May 28, 2004, dated Jun. 12, 2008, 16 pgs.
Clark, Kenneth A.; Applicant Interview Summary for U.S. Appl. No. 14/462,023, filed Aug. 18, 2014, dated Nov. 10, 2016, 3 pgs.
Clark, Kenneth A.; Applicant Interview Summary for U.S. Appl. No. 14/462,023, filed Aug. 18, 2014, dated Nov. 13, 2015, 3 pgs.
Clark, Kenneth A.; Corrected Notice of Allowability for U.S. Appl. No. 14/462,023, filed Aug. 18, 2014, dated Mar. 6, 2017, 7 pgs.
Clark, Kenneth A.; Final Office Action for U.S. Appl. No. 14/462,023, filed Aug. 18, 2014, dated Jul. 15, 2015, 29 pgs.
Clark, Kenneth A.; Final Office Action for U.S. Appl. No. 14/462,023, filed Aug. 18, 2014, dated Mar. 9, 2016, 34 pgs.
Clark, Kenneth A.; Final Office Action for U.S. Appl. No. 14/462,023, filed Aug. 18, 2014; dated Oct. 6, 2016; 33 pgs.
Clark, Kenneth A.; Issue Notification for U.S. Appl. No. 14/462,023, filed Aug. 18, 2014, dated Mar. 29, 2017, 1 page.
Clark, Kenneth A.; Non-Final Office Action for U.S. Appl. No. 14/462,023, filed Aug. 18, 2014, dated Dec. 22, 2014, 26 pgs.
Clark, Kenneth A.; Notice of Allowance for U.S. Appl. No. 14/462,023, filed Aug. 18, 2014, dated Feb. 13, 2017, 10 pgs.
Taylor, Thomas; Non-Final Office Action for U.S. Appl. No. 10/856,035, filed May 28, 2004, dated Jan. 30, 2007, 7 pgs.
Clark, Kenneth A.; Non-Final Office Action for U.S. Appl. No. 14/462,023, filed Aug. 18, 2014, dated Jun. 29, 2016, 28 pgs.
Clark, Kenneth A.; Non-Final Office Action for U.S. Appl. No. 14/462,023, filed Aug. 18, 2014, dated Sep. 23, 2015, 28 pgs.
Taylor, Thomas; Non-Final Office Action for U.S. Appl. No. 0/856,035, filed May 28, 2004, dated May 16, 2006, 13 pgs.
Newman, Michael; Non-Final Office Action for U.S. Appl. No. 10/691,289, filed Oct. 20, 2003, dated Mar. 11, 2004, 7 pgs.
Newman, Michael; Notice of Allowance for U.S. Appl. No. 0/691,289, filed Oct. 20, 2003, dated Oct. 27, 2004, 14 pgs.
Taylor, Thomas; Issue Notification for U.S. Appl. No. 10/856,035, filed May 28, 2004, dated Sep. 24, 2008, 1 pg.
Taylor, Thomas; Examiner Interview Summary Record for U.S. Appl. No. 10/856,000, filed May 28, 2004, dated Apr. 26, 2007, 5 pgs.
Taylor, Thomas; Final Office Action for U.S. Appl. No. 10/856,000, filed May 28, 2004, dated Dec. 21, 2006, 6 pgs.
Taylor, Thomas; Issue Notification for U.S. Appl. No. 10/856,000, filed May 28, 2004, dated Sep. 12, 2007, 1 pg.
Taylor, Thomas; Non-final Office Action for U.S. Appl. No. 10/856,000, filed May 28, 2004, dated May 8, 2006, 9 pgs.
Taylor, Thomas; Notice of Allowance for U.S. Appl. No. 10/856,000, filed May 28, 2004, dated May 30, 2007, 4 pgs.
Taylor, Thomas; Restriction Requirement for U.S. Appl. No. 10/856,000, filed May 28, 2004, dated Feb. 1, 2006, 5 pgs.
Taylor, Thomas; Non-Final Office Action for U.S. Appl. No. 10/864,718, filed Jun. 9, 2004, dated Mar. 13, 2006, 12 pgs.
Taylor, Thomas; Non-Final Office Action for U.S. Appl. No. 11/865,631, filed Oct. 1, 2007, dated Jul. 18, 2008, 20 pgs.
Taylor, Thomas; Restriction Requirement for U.S. Appl. No. 11/865,631, filed Oct. 1, 2007, dated Mar. 18, 2008, 7 pgs.
Taylor, Thomas; Final Office Action for U.S. Appl. No. 10/856,035, filed May 28, 2004, dated Oct. 30, 2007, 8 pgs.
Taylor, Thomas; Issue Notification for U.S. Appl. No. 10/856,003, filed May 28, 2004, dated Feb. 11, 2009, 1 pg.
Taylor, Thomas; Non-Final Office Action for U.S. Appl. No. 10/856,003, filed May 28, 2004, dated Jan. 11, 2007, 10 pgs.
Taylor, Thomas; Non-Final Office Action for U.S. Appl. No. 10/856,003, filed May 28, 2004, dated Jul. 26, 2007, 7 pgs.
Taylor, Thomas; Notice of Allowance for U.S. Appl. No. 10/856,003, filed May 28, 2004, dated Nov. 10, 2008, 6 pgs.
Taylor, Thomas;Final Office Action for U.S. Appl. No. 10/856,003, filed May 28, 2004, dated Apr. 17, 2008, 8 pgs.
Taylor, Thomas; Notice of Allowance for U.S. Appl. No. 10/856,465, filed May 28, 2004, dated Mar. 10, 2006, 12 pgs.
Taylor, Thomas; Issue Notificaiton for U.S. Appl. No. 10/864,560, filed Jun. 9, 2004, dated Jan. 31, 2007, 1 pg.
Taylor, Thomas; Non-Final Office Action for U.S. Appl. No. 10/864,560, filed Jun. 9, 2004, dated Mar. 13, 2006, 14 pgs.
Taylor, Thomas; Notice of Allowance for U.S. Appl. No. 10/864,560, filed Jun. 9, 2004, dated Oct. 11, 2006, 6 pgs.
Taylor, Thomas; Issue Notification for U.S. Appl. No. 10/864,718, filed Jun. 9, 2004, dated Jun. 20, 2007, 1 pg.
Taylor, Thomas M.; Examination Report for Australian patent application No. 2017232180, filed Jun. 1, 2011, dated Nov. 9, 2018, 4 pgs.
Fleury, Jr., Leo W.; Office Action for Canadian application No. 2,863,349, filed Feb. 6, 2013, dated Sep. 26, 2018, 3 pgs.
Taylor, Thomas; Notice of Allowance for U.S. Appl. No. 10/864,718, filed Jun. 9, 2004, dated Mar. 14, 2007, 6 pgs.
Taylor, Thomas; Issue Notification for U.S. Appl. No. 10/864,725, filed Jun. 9, 2004, dated Jun. 20, 2007, 1 pg.
Taylor, Thomas; Non-Final Office Action for U.S. Appl. No. 10/864,725, filed Jun. 9, 2004, dated Mar. 14, 2006, 12 pgs.
Taylor, Thomas; Notice of Allowance for U.S. Appl. No. 10/864,725, filed Jun. 9, 2004, dated Mar. 14, 2007, 6 pgs.

(56) References Cited

OTHER PUBLICATIONS

Taylor, Thomas; Issue Notification for U.S. Appl. No. 10/864,743, filed Jun. 9, 2004, dated Jun. 20, 2007, 1 pgs.
Taylor, Thomas; Non-Final Office Action for U.S. Appl. No. 10/864,743, filed Jun. 9, 2004, dated Mar. 14, 2006, 12 pgs.
Taylor, Thomas; Notice of Allowance for U.S. Appl. No. 10/864,743, filed Jun. 9, 2004, dated Mar. 14, 2007, 6 pgs.
Taylor, Thomas Moriz; Final Office Action for U.S. Appl. No. 13/117,963, filed May 27, 2011, dated Apr. 3, 2014, 16 pgs.
Taylor, Thomas Moriz; Final Office Action for U.S. Appl. No. 13/117,963, filed May 27, 2011, dated Aug. 1, 2013; 22 pgs.
Taylor, Thomas Moriz; Issue Notification for U.S. Appl. No. 13/117,963, filed May 27, 2011, dated Sep. 16, 2015, 1 pg.
Taylor, Thomas Moriz; Non-Final Office Action for U.S. Appl. No. 13/117,963, filed May 27, 2011, dated Dec. 17, 2013; 23 pgs.
Taylor, Thomas Moriz; Non-Final Office Action for U.S. Appl. No. 13/117,963, filed May 27, 2011, dated Feb. 27, 2013; 43 pgs.
Taylor, Thomas Moriz; Notice of Allowance for U.S. Appl. No. 13/117,963, filed May 27, 2011, dated Jun. 3, 2015, 9 pgs.
Taylor, Thomas Moriz; Issue Notification for U.S. Appl. No. 14/858,463, filed Sep. 18, 2015, dated Apr. 11, 2018, 1 pg.
Taylor, Thomas Moriz; Non-Final Office Action for U.S. Appl. No. 14/858,463, filed Sep. 18, 2015, dated Sep. 11, 2017, 64 pgs.
Taylor, Thomas Moriz; Notice of Allowance for U.S. Appl. No. 14/858,463, filed Sep. 18, 2015, dated Jan. 12, 2018, 9 pgs.
Fleury Jr., Leo W.; Final Office Action for U.S. Appl. No. 13/760,804, filed Feb. 6, 2013, dated Sep. 2, 2014, 19 pgs.
Fleury Jr., Leo W.; Issue Notification for U.S. Appl. No. 13/760,804, filed Feb. 6, 2013, dated Sep. 14, 2016, 1 pg.
Fleury Jr., Leo W.; Non-Final Office Action for U.S. Appl. No. 13/760,804, filed Feb. 6, 2013, dated May 21, 2014, 26 pgs.
Fleury, Jr., Leo W.; Applicant Interview Summary for U.S. Appl. No. 13/760,804, filed Feb. 6, 2013, dated Jul. 21, 2015, 3 pgs.
Fleury, Jr., Leo W.; Final Office Action for U.S. Appl. No. 13/760,804, filed Feb. 6, 2013, dated Apr. 18, 2016, 27 pgs.
Fleury, Jr., Leo W.; Final Office Action for U.S. Appl. No. 13/760,804, filed Feb. 6, 2013, dated Jun. 8, 2015, 13 pgs.
Fleury, Jr., Leo W.; Non-Final Office Action for U.S. Appl. No. 13/760,804, filed Feb. 6, 2013, dated Jan. 8, 2015, 14 pgs.
Fleury, Jr., Leo W.; Non-Final Office Action for U.S. Appl. No. 13/760,804, filed Feb. 6, 2013, dated Sep. 23, 2015, 32 pgs.
Fleury, Jr., Leo W.; Notice of Allowance for U.S. Appl. No. 13/760,804, filed Feb. 6, 2013, dated Jul. 5, 2016, 5 pgs.

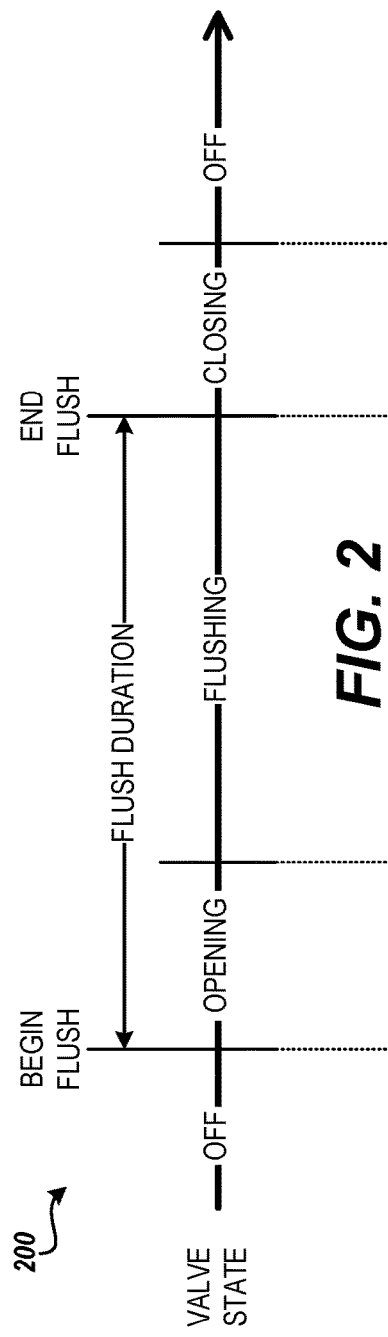
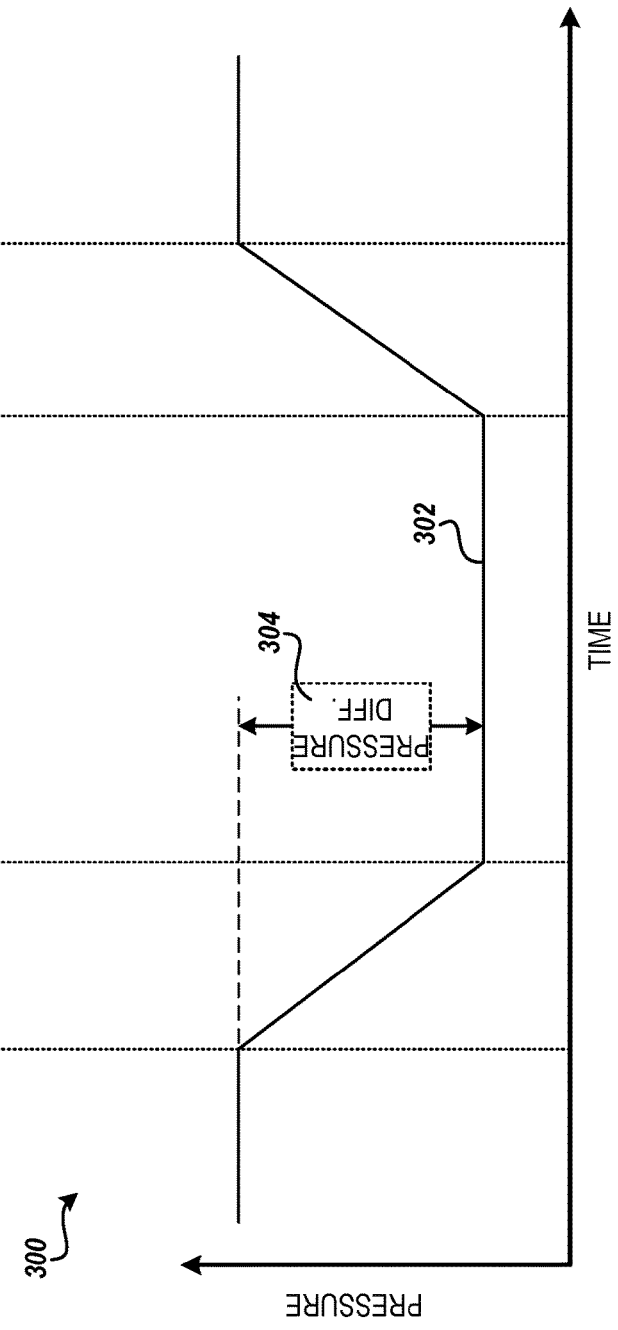
FIG. 2
FIG. 3

FLUSHING VERIFICATION AND MANAGEMENT SYSTEM

BRIEF SUMMARY

The present disclosure relates to technologies for controlling and monitoring an electro-mechanical flushing mechanism in a pressurized water distribution system in order to maintain water quality throughout the distribution system. According to some embodiments, a method comprises taking a first pressure reading of a fluid in a supply channel, the supply channel being in fluid communication with a distribution line of a fluid distribution system and terminated by a flushing valve in the flushing mechanism. The flushing valve is then actuated causing the valve to change state. A second pressure reading is taken of the fluid in the supply channel and a difference between the first pressure reading and the second pressure reading is computed. The computed difference is compared to a minimum pressure differential value, and, upon determining that the difference is not greater than the minimum pressure differential value, a central control system of the fluid distribution system is alerted that a failure has occurred.

According to further embodiments, a computer-readable medium comprises processor-executable instructions that cause a processor operably connected to a flush valve and a pressure sensor located in close proximity to the flushing valve to take a first pressure reading in a supply channel, the supply channel being in fluid communication with a distribution line of the water distribution system and terminated by the flushing valve. The flushing valve is actuated causing the flushing valve to open, and a second pressure reading is taken. The difference between the first pressure reading and the second pressure reading is compared to a minimum pressure differential value; and, upon determining that the difference between the first pressure reading and the second pressure reading is not greater than the minimum pressure differential value, a central control system of the water distribution system is alerted that a failure has occurred.

According to further embodiments, a water distribution system comprises at least one distribution line carrying pressurized water, a flushing mechanism, and a controller. The flushing mechanisms comprises a supply channel in fluid communication with the at least one distribution line, a flushing valve connected to the supply channel and configured to allow the flow of water from the at least one distribution line through the supply channel and out a discharge channel into an environment when opened, and a pressure sensor configured to read a pressure of the water in the supply channel. The controller is operatively connected to the flushing valve and the pressure sensor, and configured to take a first pressure reading of the water in the a supply channel, actuate the flushing valve, take a second pressure reading of the water in the supply channel, and compare a difference between the first pressure reading and the second pressure reading to a minimum pressure differential value for the flushing mechanism to determine whether the actuation of the flushing valve was successful.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

FIG. 2 is a state diagram showing the state of a valve in the electro-mechanical flushing mechanism at various phases of a flushing operation, according to embodiments described herein.

FIG. 3 is a graph of pressure read at a pressure sensor of the electro-mechanical flushing mechanism during the various phases of the flushing operation, according to embodiments described herein.

DETAILED DESCRIPTION

Figure 1:
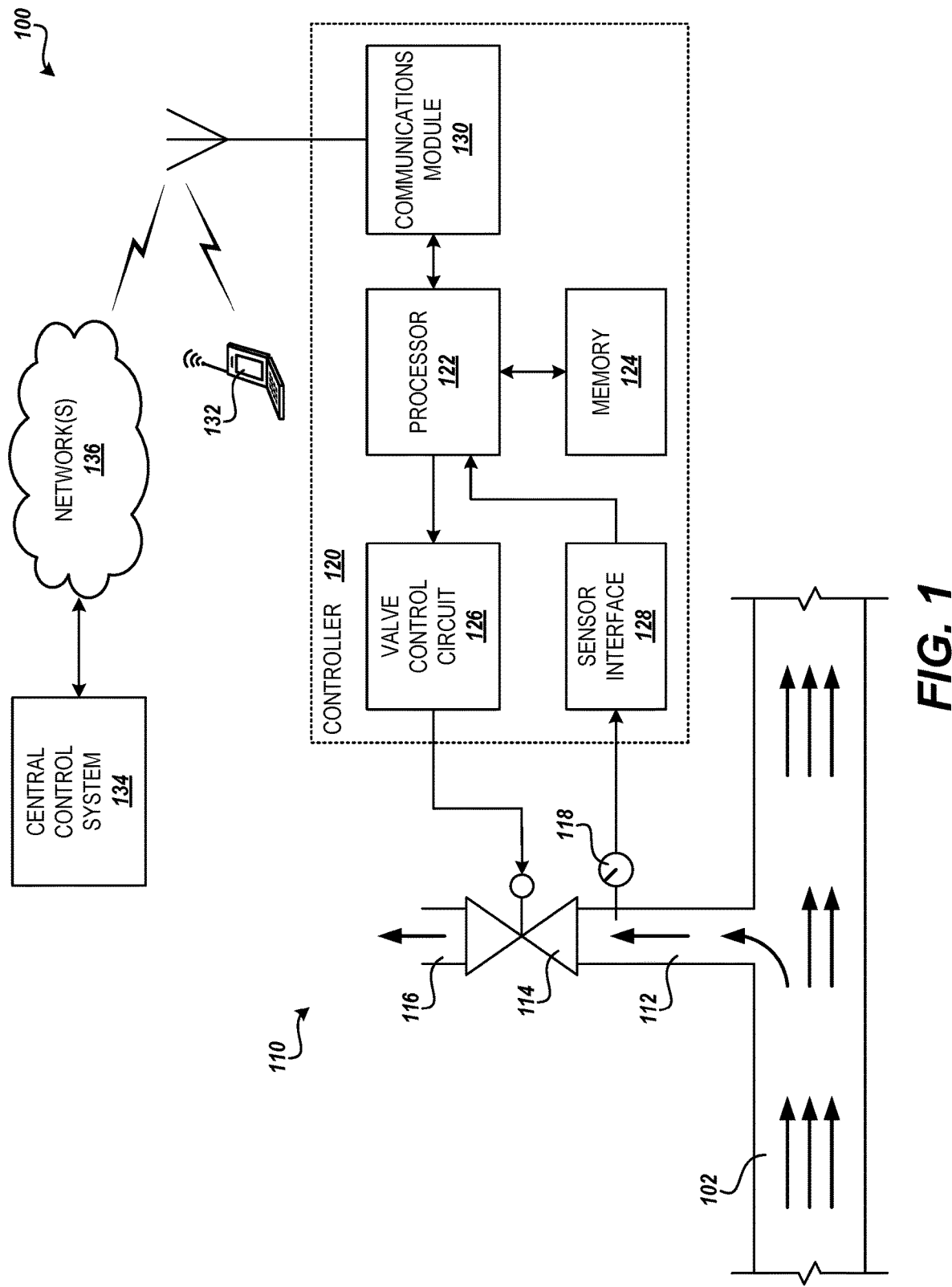
FIG. 1 is a block diagram showing one illustrative environment for the implementation of the embodiments described herein, including an electro-mechanical flushing mechanism in fluid communication with a pressurized water distribution system.

The following detailed description is directed to technologies for controlling and monitoring an electro-mechanical flushing mechanism in a pressurized water distribution system in order to maintain water quality throughout the distribution system. When fresh, clean, and safe water leaves a water treatment plant, it can take months for the water to flow through the various pipes of the distribution system and reach the water consumer. The duration of the water in the distribution system is referred to as "water age." Aged water can become stale and unsafe for human consumption over time. Accordingly, the water distribution system may include a flushing system comprising one or more flushing mechanisms distributed throughout the system to flush out aged water that does not meet regulatory requirements in order to pull in fresh, safe water from treatment plant.

In order to guarantee reliable operation of the flushing system and ensure fresh and safe water reaches consumers, a flushing verification and management system may be implemented to achieve reliable verification and alerting mechanisms that will guarantee reliable flushing or dispatching of alert if a flush did not occur due to mechanical or electronic failure of the flushing mechanisms. The flushing verification and management system may provide for scheduling of flushing operations at the various flushing mechanisms throughout the water distribution system from a central control system and/or via a web interface. The central control system or interface may provide for scheduling of flushing operations at a specific flushing mechanism, for a specific duration, on specific days and times, or when measured water parameters, such as pressure, temperature, disinfectant concentration, turbidity, temperature, and/or the like, fall into pre-defined ranges.

The flushing verification and management system may further include a flushing verification method comprising utilizing and sampling pressure readings before and after a flushing operation using a sensor located in front of and in proximity to a flushing valve of the flushing mechanism, according to some embodiments. The verification method may comprise sampling a pressure before a transition state, latching a solenoid of the flushing valve in an open position, remaining in the opening state for a maximum time required to open the valve, recording a second pressure sample, and performing a validation of a successful transition from off to open (flushing) states (or vice versa) by comparing before and after transition state pressures. Further, if actuation of the flushing valve is not successful, the flushing mechanism may be programmed to send a notification to the central control system, according to further embodiments. Further, the flushing mechanism may include implementation of "Do Not Flush Period" and "Do Not Flush If" rules that allow local overriding of scheduled flushing operations when certain conditions occur, such as peak water usage times, when the water pressure in the distribution system dips below a minimum pressure required to begin flush, or the like, as will be described in more detail herein.

FIG. 1 and the following description are intended to provide a general description of a suitable environment in which the embodiments described herein may be implemented. In particular, FIG. 1 shows an illustrative water distribution system 100 including an exemplary electro-mechanical flushing mechanism 110. According to embodiments, the water distribution system 100 may comprise a network of pipes (also referred to herein as "distribution lines"), such as distribution line 102, that transmits and distributes water from a treatment plant to water consumers. The flushing mechanism 110 may include a supply channel 112 in fluid connection with, or "tapped into," the distribution line 102. The supply channel 112 provides a path for the flow of fluid from the distribution line 102 to a flushing valve 114. In some embodiments, the flushing valve 114 may comprise a pilot-operated solenoid valve. In further embodiments, the flushing valve 114 may comprise a direct acting solenoid valve, a servo-driven gate valve, or any other type of electromechanically operated valve known in the art. The flushing valve 114 may further connect to a discharge channel 116 that directs water into the environment, such as to ground or into a storm water drain, when the flushing valve is opened. According to some embodiments, the supply channel 112 and/or the discharge channel 116 may comprise pipes or conduits of significantly smaller diameter than the distribution line 102. In further embodiments, the supply channel 112 may include one or more of a curb stop, a cam lock release system, a manually operated ball valve, a pressure reducer/regulator, and the like between the tap at the water distribution line 102 and the flushing valve 114.

The flushing mechanism 110 further comprises a pressure sensor 118 in fluid communication with the supply channel 112. The pressure sensor 118 measures pressure of the water in the supply channel 112. According to some embodiments, the pressure sensor is installed in the supply channel 112 in close proximity to the flushing valve 114, e.g. less than 24 inches from the valve. It will be appreciated that, when the flushing valve 114 is closed, the pressure sensor 118 will register a same pressure in the supply channel 112 as the pressure in the water distribution line 102. When the flushing valve 114 is opened, such as during a flushing operation in the flushing mechanism 110, there will be pressure drop between water distribution system tap and the pressure sensor 118 due to flow of water through the supply channel 112 and valve and out through the discharge channel 116.

The flushing mechanism 110 may further include a controller 120 that controls the operations of the flushing valve 114. According to some embodiments, the controller 120 may include a processor 122. The processor 122 may comprise a microcontroller or other processing resource capable executing instructions and routines stored in a connected memory 124. The memory 124 may comprise a computer-readable storage medium for storing processor-executable instructions, data structures and other information. The memory 124 may comprise a non-volatile memory, such as read-only memory ("ROM") and/or FLASH memory. The memory 124 may further comprise a volatile random-access memory ("RAM"), such as dynamic random access memory ("DRAM") or synchronous dynamic random dom access memory ("SDRAM").

In some embodiments, the memory 124 may store a firmware that comprises commands and data structures necessary for performing the operations of the flushing mechanism 110. According to further embodiments, the memory 124 may store processor-executable instructions that, when executed by the processor 122, perform some or all of the steps of the routine 400 described herein for controlling and monitoring an electro-mechanical flushing mechanism in a pressurized water distribution system, as described in regard to FIG. 4. In further embodiments, the memory 124 may contain parameters that affect the operation of the flushing mechanism 110, such as schedules and/or conditions for execution of flushing operations, flushing durations, "Flush If," "Flush Period," "Do Not Flush Period," and "Do Not Flush If" rules as described herein, and the like.

According to embodiments, the processor 122 is operatively connected to the flushing valve 114 through a valve control circuit 126 that allows the processor to open and close the valve. For example, the valve control circuit 126 may interface the solenoid in the in the flushing valve 114 with one or more digital I/O lines of the microcontroller, allowing a signal to be sent to the solenoid to control the valve. The processor 122 is further operatively connected to the pressure sensor 118 through a sensor interface 128 within the controller 120 that allows the processor to take pressure readings of the fluid in the supply channel 112. For example, the sensor interface 128 may convert an analog voltage output of the pressure sensor 118 corresponding to the sensed pressure to a digital value for the processor 122.

The controller 120 may further contain a communications module 130. The communication module 130 may provide a wired or wireless connection of the controller 120 to a local programming unit 132 or a central control system 134 of the water distribution system 100 through one or more networks 136, such as a wireless local area network ("WLAN"), Bluetooth, Wi-Fi, metropolitan area network ("MAN"), wide area network ("WAN"), cellular data network, and/or the Internet. The local programming unit 132 and/or the central control system 134 may allow configuration of the controller, setting of parameter values, such as schedules and/or conditions for execution of flushing operations, flushing durations, "Flush If," "Flush Period," "Do Not Flush Period," or "Do Not Flush If" rules, and the like from a remote location. According to some embodiments, the central control system 134 may provide a Web interface allowing water company personnel to control and configure the various flushing mechanisms 110 in the water distribution system 100.

In addition to the memory 124, the central control system 134 and/or other components of the water distribution system 100 may include other computer-readable media storing program modules, data structures, and other data described herein for controlling and monitoring an electro-mechanical flushing mechanism in a pressurized water distribution system in order to maintain water quality throughout the distribution system. It will be appreciated by those skilled in the art that computer-readable media can be any available media that may be accessed by the controller 120, central control system 134, or other computing system for the non-transitory storage of information. Computer-readable media includes volatile and non-volatile, removable and non-removable storage media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure and/or functionality of the flushing mechanism 110 and the controller 120 may be different that that illustrated in FIG. 1 and described herein. For example, the processor 122, memory 124, valve control circuit 126, sensor interface 128, communications module 130, and/or other components and circuitry of the controller 120 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the water distribution system 100, flushing mechanism 110, and/or controller 120 may not include all of the components shown in FIG. 1, may include other components that are not explicitly shown in FIG. 1 or may include valves, sensors, control units, circuitry, control systems, networks, and other devices and components utilizing architectures completely different than those shown in FIG. 1.

FIG. 2 shows a state diagram 200 illustrating the various states of the flushing valve 114 and the timing of the state transitions during a typical flushing operation of a flushing mechanism 110, according to some embodiments. A flushing operation occurs when the controller 120 opens the flushing valve 114 causing water to flow from the distribution line 102 through the supply channel 112 and the valve and out through the discharge channel 116 into the environment. Before a flush operation is begun, the flushing valve 114 is in an "OFF" state, as shown in the state diagram 200. Once the flushing operation begins, the controller 120 actuates the solenoid or other electromechanical mechanism of the flushing valve 114 to open the valve. According to some embodiments, the flushing valve 114 requires a period of time to fully open once the solenoid is actuated, and is in an "OPENING" state during this period. Once fully open, the flush valve 140 remains in a "FLUSHING" state for the remainder of the flushing operation, referred to herein as the "flush duration." At the end of the flushing operation, the controller actuates the solenoid of the flushing valve 114 to close the valve. The flushing valve 114 enters a "CLOSING" states for a period of time required for the valve to fully close, after which it will return to the OFF state.

FIG. 3 shows a graph 300 illustrating the pressure read by the pressure sensor 118 in the supply channel 112 as the flushing valve 114 transitions through the various states described above. When the flushing valve 114 is in the OFF state, the pressure sensor 118 registers a same value as the pressure in the water distribution line 102. However, once a flushing operation begins, the pressure in the supply channel 112 will drop as the flushing valve 114 is OPENING due to the flow of water from the distribution line 102 through the valve and out through the discharge channel 116, as represented by the line 302 in the graph 300. Once the flushing valve 114 is in the FLUSHING state (fully opened), the pressure will remain low as the water flows until the flushing operation is ended and the valve begins to close.

According to some embodiments, the pressure differential 304 between the pressure in the supply channel 112 with the flushing valve 114 in the OFF state and the valve in the FLUSHING state may be utilized to verify proper operation of the valve during a typical flushing operation. A minimum pressure differential value between the OFF and FLUSHING states of a flushing mechanism may be determined for the flushing mechanism, and the pressure in the supply channel 112 measured before and after an OPENING and/or CLOSING states may be compared to this minimum pressure differential value to verify operation of the valve. The minimum pressure differential value may vary depending on a number of factors, including the pressure in the distribution line 102, the cross-sectional area of the supply channel 112 and/or discharge channel 116, the flow rate through the flushing valve 114, and the like. For a specific flushing mechanism 110, a number of test flushing operations may be executed to determine a baseline value and/or range for the minimum pressure differential value, according to some embodiments.

Figure 4:
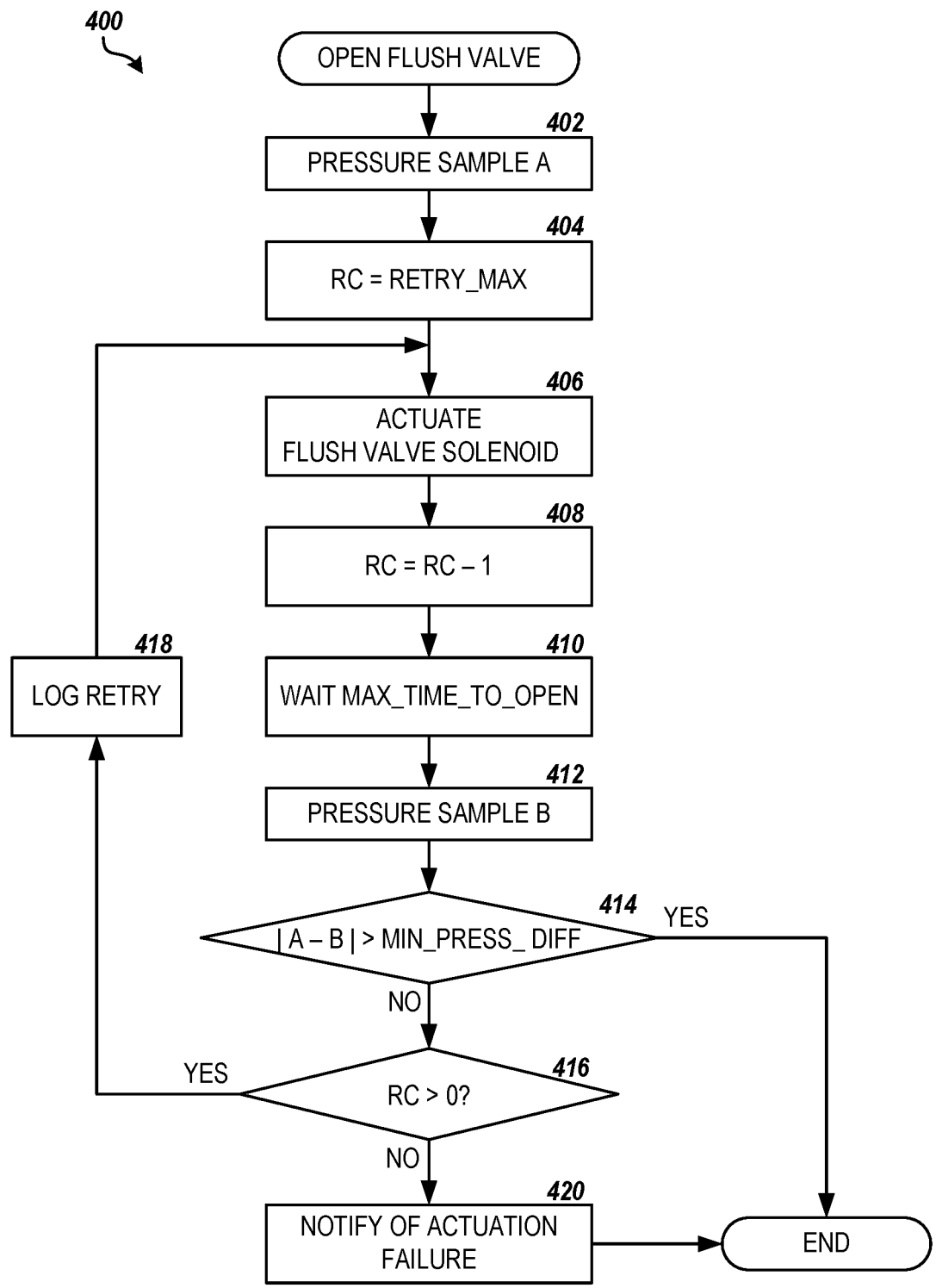
FIG. 4 is a flow diagram showing one method of controlling and monitoring an electro-mechanical flushing mechanism in a pressurized water distribution system, according to embodiments described herein.

FIG. 4 illustrates one routine for controlling and monitoring an electro-mechanical flushing mechanism in a pressurized water distribution system. Specifically FIG. 4 shows a routine 400 for opening the flushing valve 114 at the beginning of a flushing operation. In some embodiments, the routine 400 may be performed by the controller by the processor 122 implemented in the controller 120 of the flushing mechanism 110 at the beginning of a scheduled flushing operation. In further embodiments, the routine 400 may be performed by the central control system 134 communicating with the flushing mechanism over the network(s) 136, or by any combination of these and/or other components, modules, processors, and devices.

The routine 400 begins at step 402, where the processor 122 takes a pressure sample in the supply channel 112 before actuation of the flushing valve 114 (referred to as sample "A"). Next, a retry loop is initialized in case actuation of the flushing valve 114 fails. In some embodiments, the latching solenoid of the flushing valve 114 may be operated by sending a 0.1 second pulse of current in a forward direction to open the valve, and sending a 0.1 second pulse in the reverse direction to close valve. However, a single pulse may fail to properly latch the valve, so the latching operation may need to be retried some number of times. To initialize the retry loop, the processor 122 sets a retry counter ("RC") to a maximum retry count, such as three, as shown at step 404.

From step 404, the routine 400 proceeds to step 406, where the processor 122 actuates the solenoid of the flushing valve 114 to open the valve. As discussed above, this may be accomplished by sending a 0.1 second pulse of current in a forward direction to the solenoid through the valve control circuit 126, in some embodiments. Next, at step 408, the processor decrements the retry counter and then waits a maximum amount of time for the flushing valve 114 to open, as shown at step 410. The maximum amount of time for the flushing valve 114 to open may be determined for a particular flushing mechanism 110 or a class of flushing mechanisms based on the type or model of valve implemented, the nominal pressure in the supply channel 112 when the valve is in the OFF state, and the like, or the maximum amount of time for the valve to open may be determined by selecting a maximum time for a series of tests conducted on the particular flushing mechanism, for example.

Next, after waiting the maximum amount of time for the flushing valve 114 to open, the routine 400 proceeds to step 412, where the processor 122 takes another pressure sample in the supply channel 112 (referred to as sample "B"). The processor 122 then computes the pressure differential 304 by subtracting the pressure sample B value from the pressure sample A value and checks to see if the pressure differential is greater than the minimum pressure differential value for the flushing valve 114, as shown at step 414. If the pressure differential 304 is greater than the minimum pressure differential value for the valve, then the routine 400 ends. However, if the pressure differential 304 is not greater than the minimum pressure differential value for the valve, the routine 400 proceeds to step 416, where the processor 122 checks the retry counter to see if additional retries are available. If the retry counter is greater than zero, then the processor 122 may log the retry, as shown at step 418, and the routine 400 returns to step 406 where the processor tries again to actuate the solenoid of the flushing valve 114.

If, at step 416, no retries are available, the routine 400 proceeds to step 420 where the processor 122 notifies the central control system 134 or other systems that actuation of the flushing valve 114 has failed. If a scheduled flushing operation does not occur due to valve failure, the consumer may be left with possibility of consuming unsafe, aged water. For this reason, notification of the failure of a flushing operation is necessary to ensure safe drinking water. From step 420, the routine 400 ends. It will be appreciated that another routine similar to that of routine 400 could be utilized to close the flushing valve 114 at the end of a flushing operation, with the maximum time to open replaced with a maximum time to close value in step 410. This would allow for actuation of the flushing valve 114 to be verified at both the beginning and the end of flushing operations, with notifications sent to the central control system 134 for failures at any state transition of the valve.

According to further embodiments, the controller 120 may support a number of rules that control the operation of the flushing mechanism, specifically whether and when flushing operations are take place. In addition, the rules may be evaluated in an order of priority. For example, the controller 120 may support the following types of rules, listed in order of highest to lowest priority:

Do Not Flush If <condition>—do not flush if condition is true.
Do Not Flush Period—period during which all flushing is prevented.
Flush Period—scheduled flush period.
Flush If <condition>—flush if condition is true.

Any <condition> may be a simple or compound condition that can be evaluated to true or false, such as "pressure_input<40 psi." Multiple rules of each type may be created for the flushing mechanism 110. The rules may be configured through a local programming unit 132 or the central control system 134, sent to the controller 120 through the network(s) 136 and the communications module 130, and stored in the memory 124 of the controller 120. The rules may be evaluated by the processor 122 on a periodic basis, e.g., every n seconds.

A "Flush If" rule may allow flushing operations to begin in the flushing mechanism 110 if some <condition> is true. For example, a rule could be created that started a flushing operation if the chlorine level in the water system dips below a threshold concentration level or the turbidity of the water exceeds a threshold turbidity level. According to some embodiments, the levels of concentration of chlorine or other disinfectants or constituents, as well as the turbidity, temperature, and other parameters of the water in the supply channel 112 may be sampled by the controller through appropriate sensors (not shown) on a periodic basis.

A "Flush Period" rule may comprise a scheduled period for a flushing operation. In some embodiments, the scheduling of the period may be performed at the central control system 134 through a calendar interface, and then sent to the controller 120 through the network(s) 136. Validation and removal/merger of overlapping Flush Period rules may be performed in the central control system 134, by the processor 122 in the controller, or both.

A "Do Not Flush Period" rule may prevent flushing operations, either scheduled or manually initiated from the central control system 134 or a local programming unit 132, from taking place during scheduled periods. For example, Do Not Flush Period rules may be set that prevent flushing during peak water usage times, or during the day to prevent the perception that the water system is leaking/wasting water. In some embodiments, Do Not Flush Period rules may be scheduled in the central control system 134 utilizing the same calendar interface as the Flush Period rules described above.

A "Do Not Flush If" rule may have the highest priority and would prevent all flushing operations if certain conditions existed. For example, if the pressure in the distribution line 102 was already low, performing a flushing operation may cause an underpressure condition that could allow reverse flow of water into the water distribution system and/or violate local ordinances. By setting a Do Not Flush If rule with a condition of "pressure<=field minimum," such an underpressure condition caused by flushing operations may be prevented.

Based on the foregoing, it will be appreciated that technologies for controlling and monitoring an electro-mechanical flushing mechanism in a pressurized water distribution system are presented herein. While embodiments are described herein in regard to an electro-mechanical flushing device having a flushing valve, pressure sensor, and controller, it will be appreciated that the embodiments described in this disclosure may be utilized in any of the water distribution system containing these and other components, such as other various sensors, control valves, controllers, and communication devices. Flushing devices may be configured for installation above ground, partially above and partially below ground, or below ground, and may reside inside another housing or component of the water distribution system, such as a hydrant, meter box, or the like. Additionally, while various components and steps are described as residing and/or executing in the controller of the flushing device, it will be appreciated that the components and steps may reside and/or execute solely in the controller, solely on a remote computing device, or be distributed between the controller and one or more remote computing devices in any combination. The above-described embodiments are merely possible examples of implementations set forth for a clear understanding of the principles of the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or other computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
   taking, by a controller in a flushing mechanism, a first pressure reading of a fluid in a supply channel, the supply channel in fluid communication with a distribution line of a fluid distribution system and terminated by a flushing valve in the flushing mechanism;
   actuating, by the controller, the flushing valve causing the flushing valve to change state;
   taking, by the controller, a second pressure reading of the fluid in the supply channel;
   comparing, by the controller, a difference between the first pressure reading and the second pressure reading to a minimum pressure differential value; and
   upon determining that the difference between the first pressure reading and the second pressure reading is not greater than the minimum pressure differential value, alerting, by the controller, a central control system of the fluid distribution system that a failure has occurred.

2. The method of claim 1, wherein the flushing valve comprises a pilot-operated solenoid valve.

3. The method of claim 2, further comprising the step of, upon actuating the flushing valve, waiting a maximum-time-to-open time corresponding to the flushing valve before taking the second pressure reading.

4. The method of claim 1, wherein the controller takes the first and second pressure readings from a pressure sensor in fluid communication with the supply channel, the pressure sensor located in close proximity to the flushing valve.

5. The method of claim 1, wherein the flushing valve is further connected to a discharge channel through which the fluid in the distribution line may be released into an external environment when the flushing valve is opened.

6. The method of claim 1, further comprising the step of, upon determining that the difference between the first pressure reading and the second pressure reading is not greater than the minimum pressure differential value, repeating, by the controller, the actuating of the flushing valve, taking of the second pressure reading, and comparing of the difference between the first pressure reading and the second pressure reading to the minimum pressure differential value steps before alerting the central control system of the failure.

7. The method of claim 1, further comprising the steps of:
   before actuating the flushing valve, evaluating, by the controller, a condition associated with a rule configured in the controller; and
   upon determining that the condition is true, halting performance of a remainder of the steps in the method.

8. The method of claim 7, wherein the condition comprises the pressure in the supply channel being at or below a minimum field pressure for the fluid distribution system.

9. A water distribution system comprising:
   at least one distribution line carrying pressurized water;
   a flushing mechanism comprising a supply channel in fluid communication with the at least one distribution line, a flushing valve connected to the supply channel and configured to allow the flow of water from the at least one distribution line through the supply channel and out a discharge channel into an environment when opened, and a pressure sensor configured to read a pressure of the water in the supply channel; and
   a controller operatively connected to the flushing valve and the pressure sensor, and configured to
      take a first pressure reading of the water in the a supply channel,
      actuate the flushing valve,
      take a second pressure reading of the water in the supply channel, and
      compare a difference between the first pressure reading and the second pressure reading to a minimum pressure differential value for the flushing mechanism to determine whether the actuation of the flushing valve was successful.

10. The water distribution system of claim 9, further comprising a central control system, wherein the controller is further configured to, upon determining that the difference between the first pressure reading and the second pressure reading is not greater than the minimum pressure differential value, alerting the central control system that a failure has occurred.

11. The water distribution system of claim 10, wherein the controller comprises a processor, a memory, and a communication module, the communications module communicatively connected to the central control system through one or more intervening networks.

12. The water distribution system of claim 10, wherein the controller is further configured to, upon determining that the difference between the first pressure reading and the second pressure reading is not greater than the minimum pressure differential value, repeat the actuating of the flushing valve, taking of the second pressure reading, and comparing of the difference between the first pressure reading and the second pressure reading to the minimum pressure differential value before alerting the central control system of the failure.

13. The water distribution system of claim 9, wherein the flushing valve comprises a pilot-operated solenoid valve, and wherein the controller is further configured to, upon actuating the flushing valve, wait a maximum-time-to-open time corresponding to the flushing valve before taking the second pressure reading.

14. The water distribution system of claim 9, wherein the controller is further configured to:
   before actuating the flushing valve, evaluate a condition associated with a rule configured in the flushing mechanism; and
   upon determining that the condition is true, not proceeding to actuate the flushing valve, wherein the condition comprises the pressure of the water in the supply channel being at or below a minimum field pressure for the water distribution system.

\* \* \* \* \*